(12) United States Patent
Block et al.

(10) Patent No.: US 7,354,064 B2
(45) Date of Patent: Apr. 8, 2008

(54) ACTIVE TETHER AIR BAG MODULE

(75) Inventors: Robert H. Block, Clarkston, MI (US); Brian C. Ford, Mt. Clemens, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 145 days.

(21) Appl. No.: 11/314,848

(22) Filed: Dec. 21, 2005

(65) Prior Publication Data
US 2006/0170202 A1 Aug. 3, 2006

Related U.S. Application Data

(60) Provisional application No. 60/648,756, filed on Feb. 1, 2005.

(51) Int. Cl.
*B60R 21/239* (2006.01)
*B60R 21/016* (2006.01)

(52) U.S. Cl. .................................. 280/743.2; 280/739

(58) Field of Classification Search ............ 280/743.1, 280/743.2, 739, 728.2
See application file for complete search history.

(56) References Cited

U.S. PATENT DOCUMENTS

| | | | |
|---|---|---|---|
| 5,746,477 A | | 5/1998 | Saul |
| 5,762,367 A | * | 6/1998 | Wolanin ....................... 280/736 |
| 5,775,729 A | * | 7/1998 | Schneider et al. ........ 280/730.1 |
| 6,315,323 B1 | * | 11/2001 | Pack, Jr. .................. 280/743.2 |
| 6,325,415 B1 | | 12/2001 | Zelinski et al. |
| 6,390,501 B1 | | 5/2002 | Greib et al. |
| 6,581,964 B2 | * | 6/2003 | Braunschadel ........... 280/743.2 |
| 6,669,227 B2 | * | 12/2003 | Muhlbach ................ 280/728.2 |
| 6,749,217 B2 | * | 6/2004 | Damian et al. ............. 280/734 |
| 6,932,384 B2 | * | 8/2005 | Waid et al. .................. 280/739 |
| 7,083,191 B2 | * | 8/2006 | Fischer ....................... 280/739 |
| 7,083,192 B2 | * | 8/2006 | Fischer et al. ............. 280/739 |
| 2002/0096871 A1 | * | 7/2002 | Pinsenschaum et al. . 280/743.2 |
| 2002/0125706 A1 | * | 9/2002 | Greib et al. ............. 280/743.2 |
| 2003/0090091 A1 | * | 5/2003 | Dominissini et al. .... 280/730.2 |
| 2004/0046376 A1 | * | 3/2004 | Ryan ....................... 280/743.2 |
| 2004/0051285 A1 | * | 3/2004 | Fischer ....................... 280/739 |
| 2004/0075261 A1 | * | 4/2004 | Damian et al. .......... 280/743.2 |
| 2004/0090055 A1 | * | 5/2004 | Kassman et al. ........ 280/743.2 |
| 2004/0113404 A1 | * | 6/2004 | Ryan et al. ................ 280/735 |
| 2004/0119271 A1 | * | 6/2004 | Webber ...................... 280/731 |
| 2004/0155443 A1 | * | 8/2004 | Ford ........................... 280/739 |
| 2005/0023811 A1 | * | 2/2005 | Thomas ..................... 280/736 |
| 2005/0057027 A1 | * | 3/2005 | Fogle et al. ................ 280/739 |
| 2006/0071462 A1 | * | 4/2006 | Smith et al. ................ 280/739 |
| 2006/0151975 A1 | * | 7/2006 | Yamaji et al. ........... 280/728.2 |
| 2006/0170198 A1 | * | 8/2006 | Webber ...................... 280/731 |
| 2006/0192370 A1 | * | 8/2006 | Abe et al. ................... 280/735 |
| 2006/0214398 A1 | * | 9/2006 | Fredin et al. ............ 280/728.2 |

(Continued)

FOREIGN PATENT DOCUMENTS

KR 1998-035145 9/1998

*Primary Examiner*—Paul N. Dickson
*Assistant Examiner*—Timothy D. Wilhelm
(74) *Attorney, Agent, or Firm*—Markell Seitzman

(57) ABSTRACT

An air bag module (30) is disclosed having an air bag (50) and a tether (52) and an active brake (70, 80) for controlling the length of the tether in correspondence with the size of the occupant to be protected.

12 Claims, 5 Drawing Sheets

U.S. PATENT DOCUMENTS

2006/0244247 A1* 11/2006 Debler et al. ............... 280/739
2006/0284404 A1* 12/2006 Green et al. ............. 280/743.2
2007/0045997 A1* 3/2007 Abe et al. ................... 280/729
2007/0102911 A1* 5/2007 Hall et al. ................. 280/739

* cited by examiner

ACTIVE TETHER AIR BAG MODULE

This application claims the benefit of U.S. Provisional Application 60/648,756, filed on Feb. 1, 2005. The disclosure of the above application is incorporated herein by reference.

BACKGROUND AND SUMMARY OF THE INVENTION

The present invention relates to air bag modules and more particularly to an air bag module in which the length of the tether or tethers associated with the air bag is changeable in proportion to the size of the occupant to be protected.

It is an object of the present invention to provide an improved air bag module in which the length of the tether and the amount of inflation gas vented can be changed in proportion to system variables including the size and/or position of the occupant to be protected.

Accordingly the invention comprises: an air bag module having an air bag and a tether and means for controlling the length of the tether and the amount of gas vented from the module in correspondence with the size of the occupant to be protected.

Many other objects and purposes of the invention will be clear from the following detailed description of the drawings.

DETAILED DESCRIPTION OF THE DRAWINGS

Figure 1:
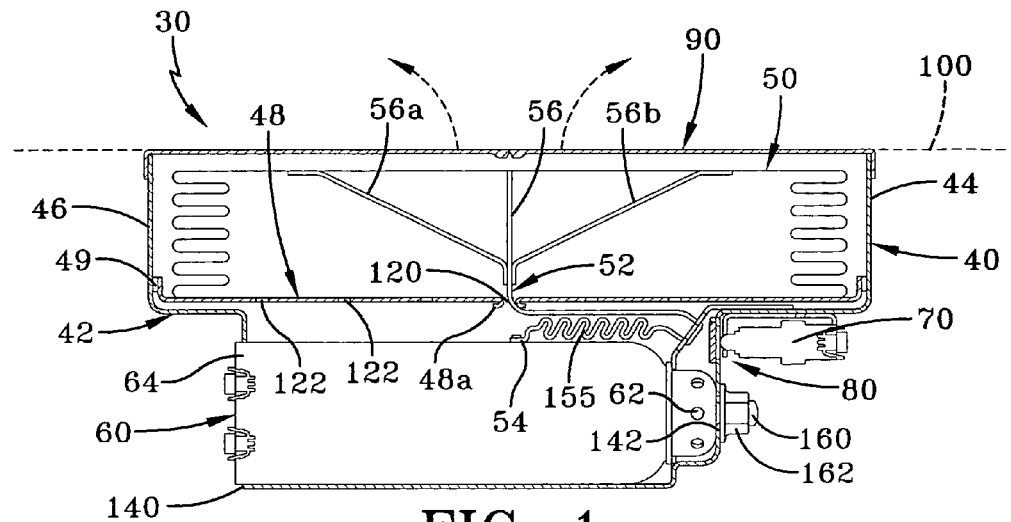
FIG. 1 illustrates a passenger side air bag module constructed in accordance with the present invention.

Reference is made to FIG. 1, which illustrates a passenger air bag module 30. The module comprises: a housing 40, a folded air bag 50 having at least one tether 52, an inflator 60, an activation member 70 and an active tether length control mechanism 80. The housing 40 includes a lower portion 42, sufficient to house the inflator 60, and an upper portion 44 of sufficient size to receive the folded air bag 50. The module 30 may optionally include a cover 90, which as illustrated is fitted to sides 46 of the housing 40. The module 30 is fitted within an opening in an instrument panel 100 of the vehicle. Alternately, and as known in the art, the air bag module (minus the separate cover 90) can be positioned below the instrument panel and the cover formed as an integral part of the instrument panel.

The housing 40 includes a separator panel or divider plate 48, which functions as a diverter for the inflation gas and which includes a plurality of openings. The plate 48 receives inflation gas from the inflator and distributes the gas into the air bag 200 through openings 122. At least one of these openings 120 receives the tether 52 of the air bag. The divider plate 48 at each tether opening 120 is formed into opposing scrolls 48a to provide a smooth surface across which the tether 52 can slide.

As can be appreciated, the air bag tether end 54 can be connected to the top 60a of the inflator 60. Another end 56 of the tether is connected to a face panel 58 of the air bag. The divider plate 48 is sealingly secured, such as being in direct contact, at its periphery, to the housing member or sides 42. By way of illustration, an optional seal 49 can also be used to sealingly connect the divider plate and the housing. The divider plate 48 can be tightly press fit to the housing, avoiding the need for a separate seal.

Figure 2:
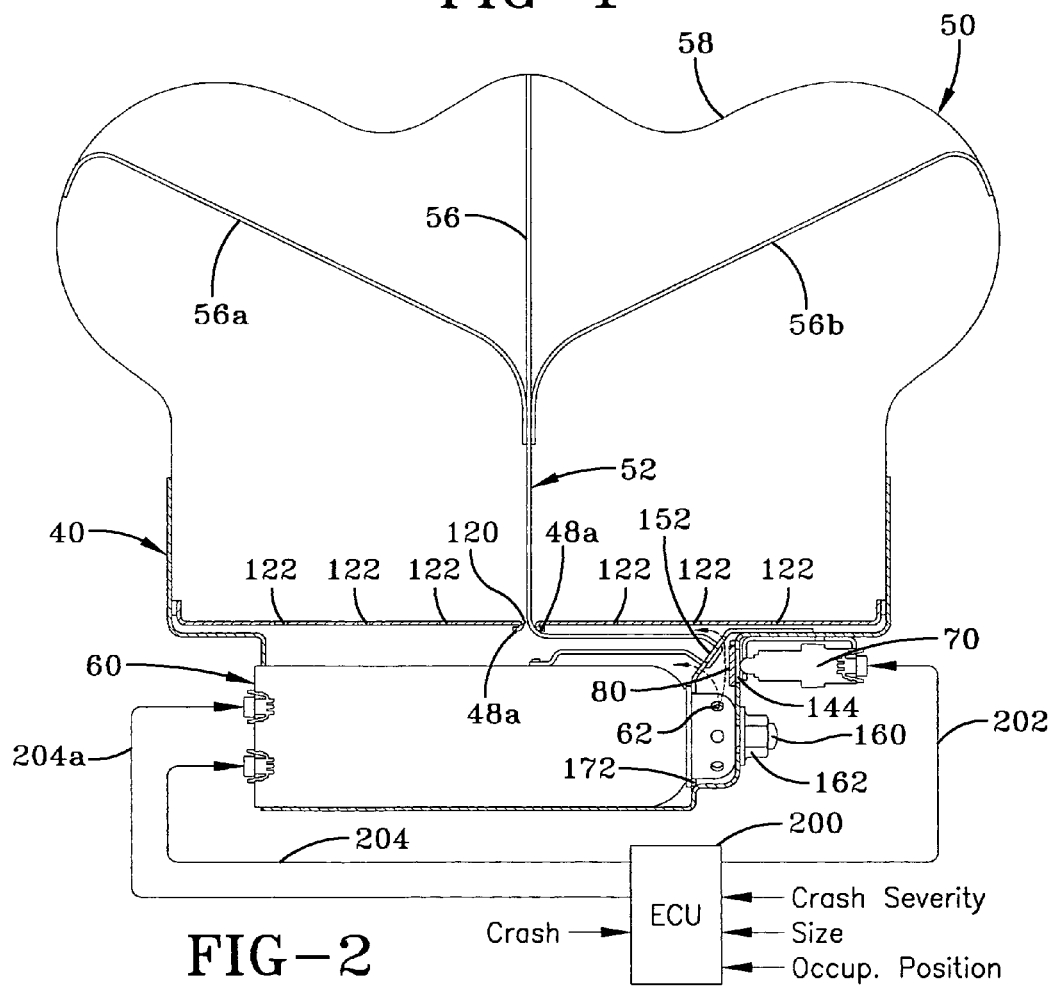
FIGS. 2 and 2a illustrate the air bag module of FIG. 1 with the air bag fully deployed and the tether at its maximum length.
Figure 2A:
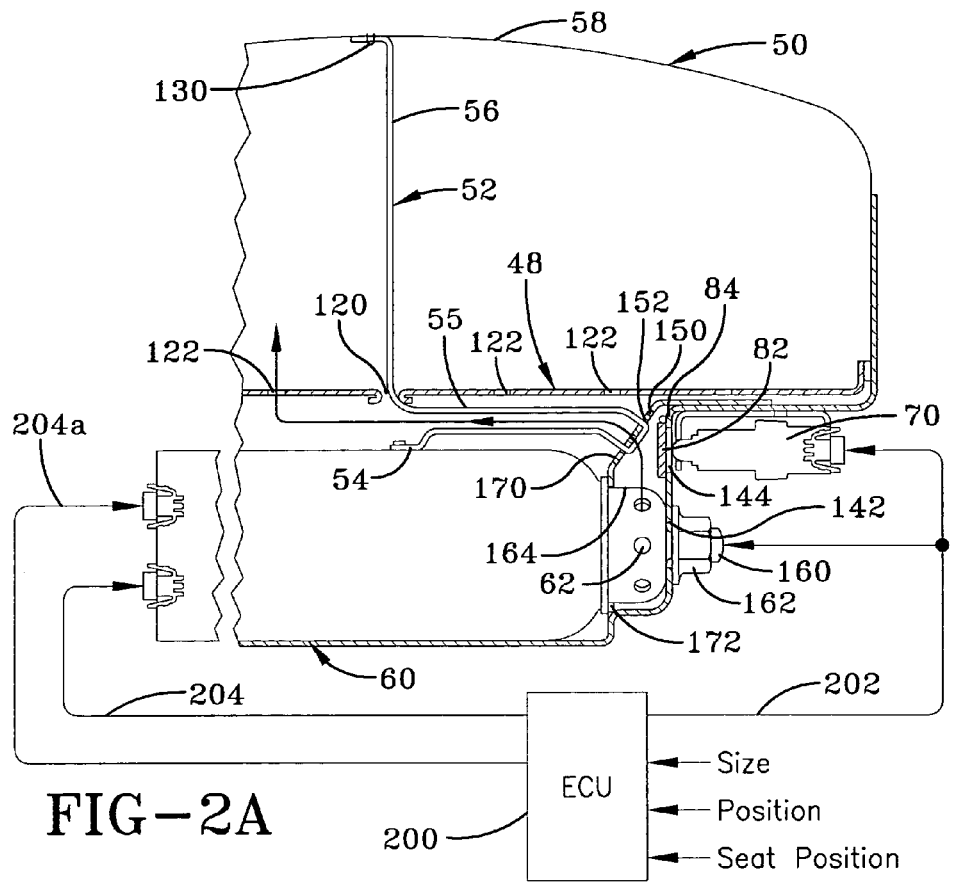

In FIGS. 1 and 2, the tether 52 is bifurcated into two side tether straps 52a and 52b, which are respectively connected to the face panel 58. A single tether end 52 is shown connected to the air bag in FIG. 2a. The tether or tethers can be connected to the face panel 58 such as by sewing, welding or other means. FIG. 2a illustrates tether end 56 being sewn to face panel 58 by a seam 130.

The divider plate 48 of housing 40 additionally includes one or more air flow communication passages such as 122, which provide a flow path for inflation gas (see arrow 61) provided or produced from inflator 60, to enter the air bag 50 after the inflation gas has exited one or more inflator exit ports 62.

The lower portion 42 of the housing 40 includes a first opening 140, which seals about the rear portion 64 of inflator 60 to block the rearward flow of inflation gas. The lower portion 42 additionally includes another opening 142, generally opposite opening 140, to receive a threaded boss or extension 160 of the inflator, which is secured to the lower housing portion 42 by a threaded fastener such as 162. The lower housing portion additionally includes a vent or vent opening 144, more clearly illustrated in FIGS. 2 and 6, through which inflation gasses exiting port(s) 62 are selectively diverted from inflating the air bag 50. The lower portion 42 of the housing 40 additionally includes an intermediary portion, baffle or member 170 having a circular opening 172, which receives the necked-down portion 164 of the inflator. The member 170 and portion 164 are configured to mate in a manner to prevent gas flow thereacross.

Figure 4:
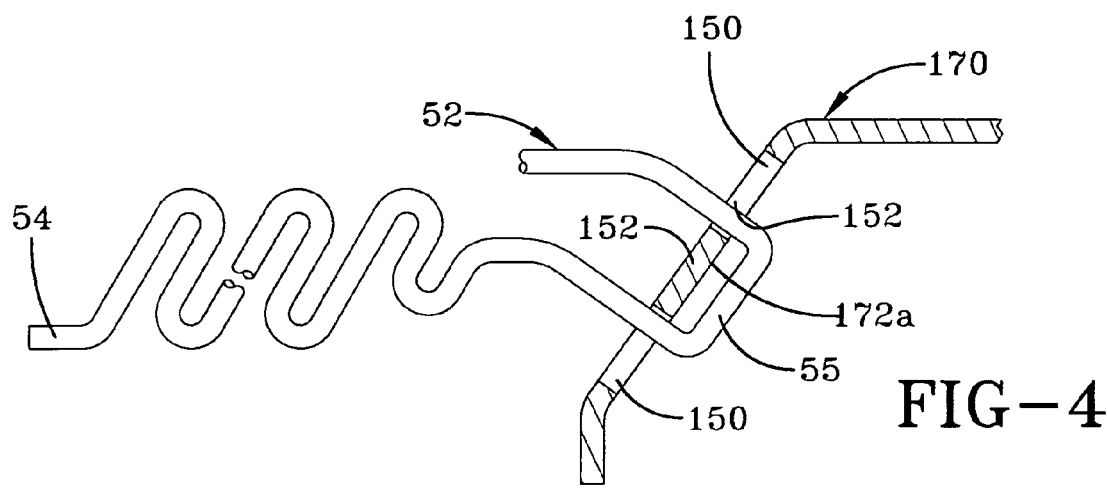
FIG. 4 illustrates an enlarged view of a portion of a section of the housing.
Figure 4B:
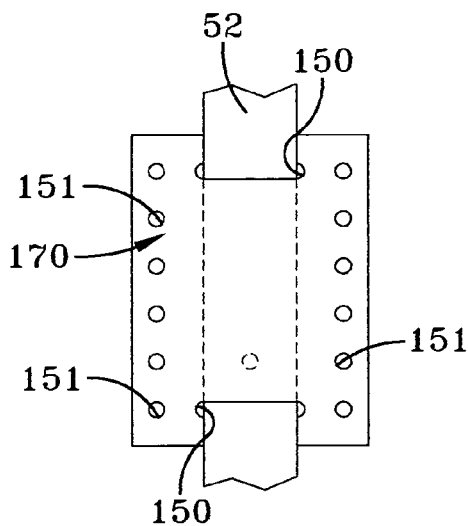
FIG. 4b is a plan view of a housing portion.
Figure 4A:
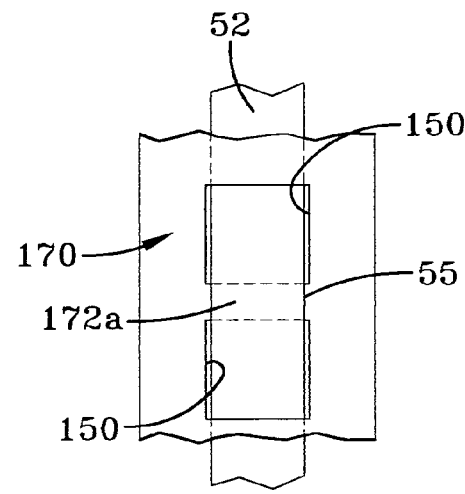
FIG. 4a is an end view of the member shown in FIG. 4.

This intermediary portion 170 additionally includes a plurality of flow openings 150 through which inflation gas flows, separated by a bar or bridge 152. A medial portion 55 of tether 52 is threaded through openings 150 and across bar 152. Bar 152 provides an engagement surface 172a for a door 82 as shown below. This relationship is more particularly illustrated in the enlargement shown in FIG. 4. FIG. 4b shows an alternate embodiment using narrowed openings 150 for the tether 52 and a plurality of smaller flow openings 151. The openings can be sized greater than the tether (oversized) and may be sufficiently large to also permit inflation gas to flow therethrough. In the preferred embodiment surface 172a is smooth. As an alternate embodiment, surface 172a can include one or more upraised ridges or protrusions, which cooperate with recessed members on an engagement surface of the door 82 to provide for enhanced stopping forces upon the tether 52. As the door 82 closes upon the tether 52, the tether is clamped between surface 172a and the door with portions of the tether enveloping the protrusions and being forced into the recesses in the engagement surface of the door 82.

Figure 3:
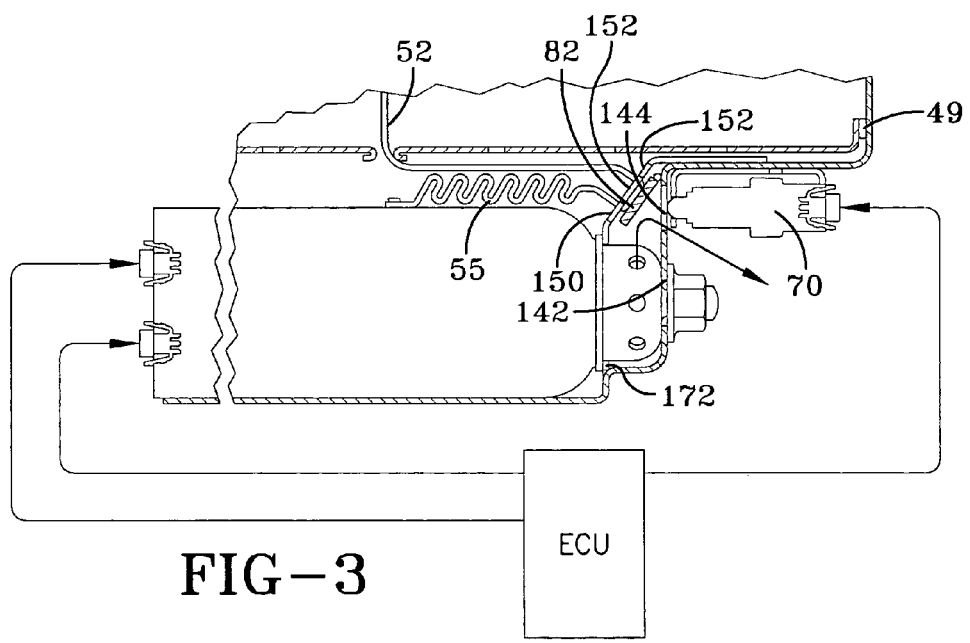
FIG. 3 shows the air bag module of FIG. 1 with the air bag deployed and the length of the tether actively restricted by a braking mechanism.

Reference is made to FIGS. 2, 2a and 3, and more particularly to the tether length control mechanism 80. This mechanism 80 includes a hinged door 82, which is attached to the lower housing 42 via one or more deformable tabs 84, which bend to effect a hinge. The tabs hold the door 82 securely in place, covering the vent opening until the tabs deform. Alternately, the hinge can be mechanical such as a piano-type hinge. If the door is plastic, the hinge can be a living hinge. If a piano hinge is used, the door 82 can be biased by a control spring, not shown, to close vent opening 144 as illustrated in FIG. 2.

Figure 5:
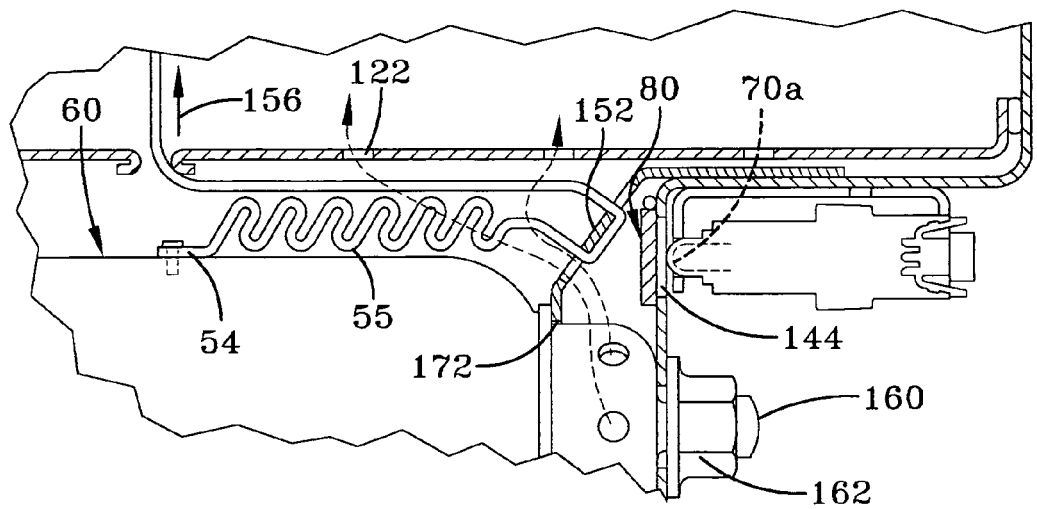
FIG. 5 is an enlarged view of a lower portion of the air bag module shown in FIG. 1.

Reference is briefly made to FIGS. 1 and 5, which illustrate the module in a pre-deployed condition. A portion of the tether designated by numeral 155 is shown folded in an accordion-pleated fashion and set upon the top of inflator 60. The tether end 52 can also be secured to the inflator or housing. As the air bag inflates, with the length control mechanism 80 not activated, as shown in FIGS. 1, 2, 2a and 5, the tether will move out from the housing as shown by arrow 156, thereby shortening the remaining folded or pleated length of the tether remaining upon the inflator. As the tether 52 expands, it is pulled and slides through openings 152 in the intermediate housing portion.

Figure 6:
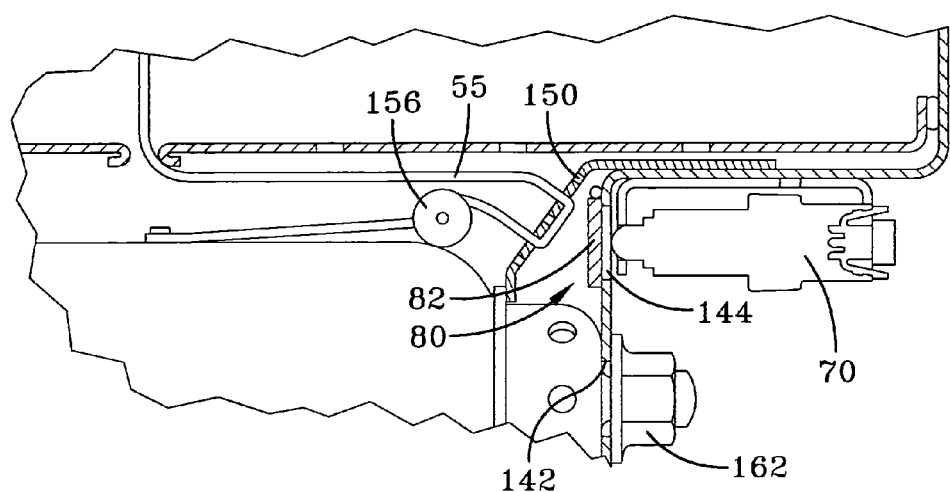
FIG. 6 shows an alternate embodiment of the invention.

Reference is briefly made to FIG. 6, which replaces the accordion-pleated portion of the tether with a reel 156, on which the medial portion 55 of the tether is stored in a compact fashion prior to being threaded into the intermediary portion of member or panel 170 of the housing and through openings 150.

Reference is again made to FIGS. 1, 2 and 2a, and more particularly to the activation member 70 shown thereon. The purpose of the activation member is to initiate movement of the door 82 against the bias force of the plate or door bias spring (not shown). Activation member 70 can be electromechanical or, for example, electrochemical and is communicated to an ECU (electronic control unit) of the vehicle, which generates an activation control signal on line 202 to activate member 70. The ECU is responsive to input signals such as signals determinative of the size and/or position of the occupant in relation to the stored module. During a vehicular crash the ECU 200, in association with sensors distributed throughout the vehicle, will determine the size of the occupant to be protected. Depending upon the algorithm to be used, the control signal may use information in regard to the position of occupant to be protected relative to the uninflated air bag, as well as the position of the occupant's seat, if occupant position is not obtained. The ECU 20 also generates an ignition signal sent to the ignitor(s) of inflator 60 via one or more of the signal lines 204 and/or 204a.

In the present invention, if a determination is made the occupant to be protected is in a size classification greater than or equal to the $50^{th}$ percentile male, upon sensing an accident, the inflator is activated in a normal manner, producing inflation gas which flows through the housing 40, through openings 150, 120 and 122 into the air bag 50, inflating same. As the air bag inflates, it pulls the tether 52 from its pre-deployment configuration, shown in FIG. 1. During inflation, the tether is pulled through openings 150 of the intermediate panel 170. During the operation of the module under these conditions, the activation member 70 is not activated and hence, the door 82 remains in the position shown covering the vent 144.

If it is determined the occupant to be protected is of a small stature, such as $5^{th}$ percentile female or small child, such as a 6-year-old child, the ECU will, in this dual mode of operation, upon sensing a crash, activate the activation member 70, which causes the door 82 to move to the position illustrated in FIG. 3. The movement of door 82 into the position shown in FIGS. 2 and 3 causes two changes in the operation of the system. Firstly, movement of the door 82 opens vent opening 144 and also closes communication with the air bag 50 through opening 150, thereby directing gas produced by inflator 60 out of the module. Consequently, the pressure achieved and size achieved by the air bag is limited or diminished in comparison to the air bag configuration achieved when protecting a larger sized occupant. Additionally, upon activation, the door 82 moves into contact with that portion of the tether interlaced about the intermediate member 170, and applies a clamping force on the tether in concert with the intermediate member 170, thereby preventing the tether from being pulled further out of the housing, thereby restricting the size of the inflating air bag.

Figures 7, 8:
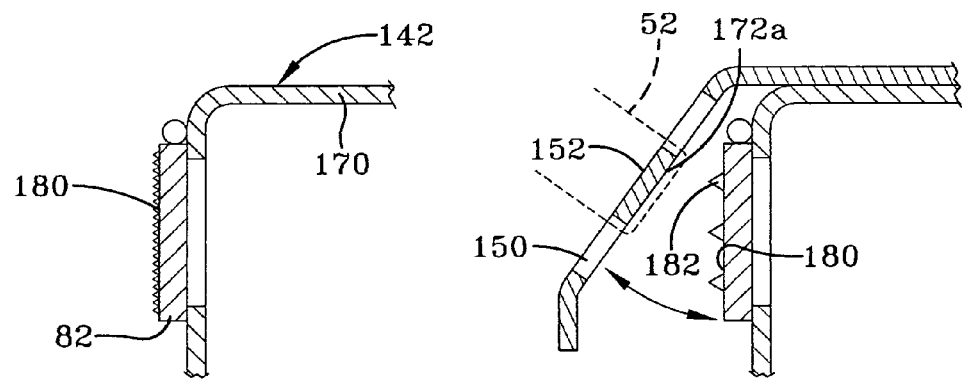
FIG. 7 illustrates a further embodiment of the invention.
FIG. 8 illustrates a further embodiment of the invention.

Reference is briefly made to FIG. 7, which illustrates an isolated view of the door 82 and a portion of the lower housing member 142. More particularly, the door includes an engagement surface 180 and a blocking surface 180a on the other side for sealingly engaging opening or vent 144. This engagement surface can include a friction enhancing profile (such as a roughened surface) or include friction material applied thereto, which when in contact with the tether, aggressively halts the motion of the tether.

Reference is made to the alternate embodiment shown in FIG. 8 in which the surface 180 is fitted with a plurality of teeth 182. Upon activation of the door, the teeth fit within corresponding openings 152 and pierce the tether, thereby stopping same.

With regard to the activation member 70, such member may include an electrically ignited pyrotechnic element, which produces products of combustion, causing a piston to move outwardly, thereby producing the initial movement of door 82 and placing the door 82 into the gas flow produced by the inflator. Having moved the door into the gas flow, the gas flow urges the door into clamping operation with the tether. Alternately, the activation member 70 may include an electrically activated solenoid type mechanism having an extendible plunger (see 70a in FIG. 5), which operates to push the door into the airflow stream in a manner as described above or, alternatively, physically engage with and move the door to its clamping position and hold the door in this clamping position when activated.

Figure 9:
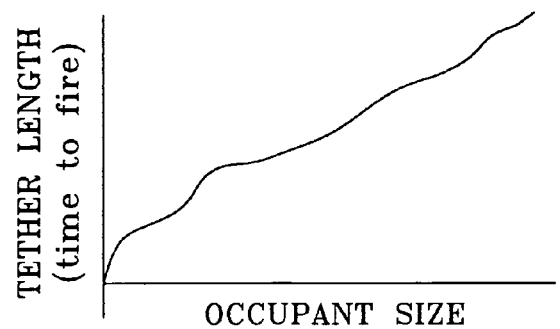
FIG. 9 shows an empirical relationship between fire time and occupant size.

The operation of the present invention is not limited to the protection of occupants falling within only two occupant size classifications, such as the small female or the large sized male. With information identifying the particular size and weight, crash severity and/or seat position of the occupant to be protected, it may be desirable to permit the air bag to inflate more or less depending upon the size of the occupant and/or severity of the crash. In this embodiment, the time of activation or firing of the activation member 70 is, for example, based upon system parameters such as the size of the occupant to be protected, crash severity, etc., which are obtained from a cooperating sensing system of known type. As can be seen in FIG. 9, the vertical axis is labeled tether length, which is proportional to the time of firing or activation of the member 130. The time of firing is also proportional to the inflated size of the air bag.

As can be appreciated by those skilled in the art, while the invention has been shown in the context of a passenger air bag module, the invention is not so limited and can be utilized in a driver side module or curtain air bag module.

Figure 10:
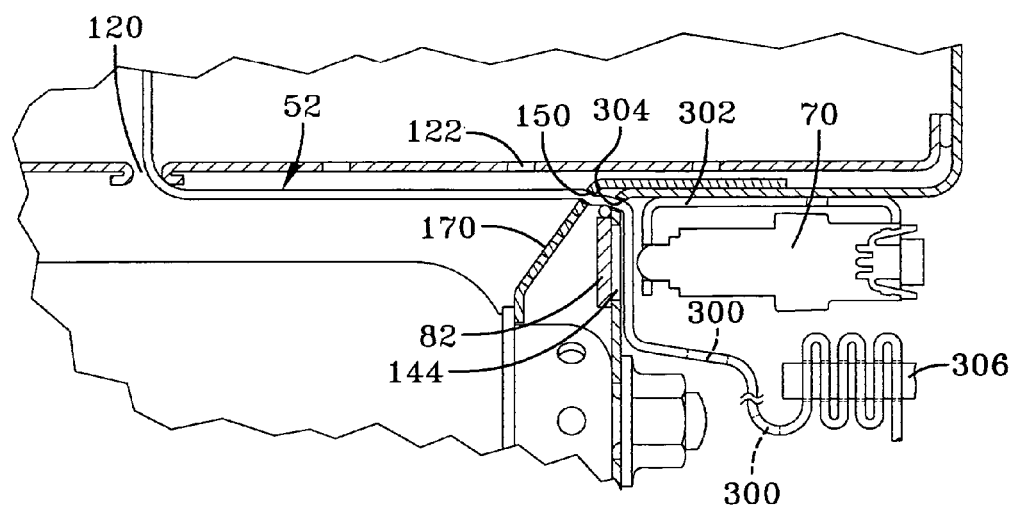
FIG. 10 illustrates a further embodiment of the invention.

Reference is briefly made to FIG. 10, which shows another embodiment of the invention. The remote end 54 of the tether 52 includes an elongated opening or slot 300. The tether 52 and actuator housing 302 are configured to position the tether 52 close to the piston 70a of the actuator 70. Additionally, the tether end 54, proximate the opening 300, is reinforced. Such reinforcement can be accomplished by adding additional layers of material to the end of the tether or by fabricating the end of the tether as a flexible metal strip (with the slot 300) or by dipping the tether end in a resin to stiffen and strengthen the tether end. As illustrated, the actuator housing 302 includes openings 304 through which the tether is threaded and held slidingly close to the piston. Movement of the tether end 54 is not restricted until the piston 70a is moved forward into the opening 300.

During operation with a large size occupant, the activator 70 is not actuated and as the air bag inflates the tether 52 is pulled outwardly by the inflating air bag. If a smaller sized occupant is to be protected, the controller 200 recognizes the size of the occupant or determines other system parameters and at the appropriate time, as detailed above, activates the actuator 70, which moves or causes the door 82 to move to a position blocking gas flow to the air bag. Such movement of the door 82 opens vent opening 144, as before, to divert inflation gas from the housing. Additionally, as the piston 70a moves, it enters the opening or slot 300 in the tether. As the tether 50 is pulled from the housing 40 as the air bag inflates, the piston 70a engages the lower end of the opening 302, thereby halting further outward movement of the air bag as the tether length is restricted.

As an alternate embodiment, the tether end 54 is configured with tabs, stops or a blocking member 306 which, as the air bag inflates, will become stuck in the openings 304 of the actuator housing, thereby halting further payout of the tether when the tether 52 has been pulled out to its maximum operable length. As illustrated, the blocking member is formed by a folded-over section of tether, the folded-over section being sufficiently large to become stuck within opening 304.

Many changes and modifications in the above-described embodiment of the invention can, of course, be carried out without departing from the scope thereof. Accordingly, that scope is intended to be limited only by the scope of the appended claims.

The invention claimed is:

1. An air bag module (30) comprising:
    an air bag (50) and a tether (52) with one end secured to and movable with the air bag upon inflation of the air bag;
    a housing member (170) having at least first and second openings (150) spaced apart from each other, the housing member including an engagement surface located between the first and second openings, the tether is threaded through the openings, the housing member, the openings and tether are configured so the tether slides across the surface (172a) of the housing member during inflation of the air bag; and
    tether stopping means (82), including a clamp mechanism movable from an initial position disengaged from the tether to an engaged position in engagement with the tether during air bag inflation for stopping the tether and hence stopping movement of that portion of the air bag linked to the tether to limit the inflated size of the air bag.

2. The module according to claim 1 wherein the first and second openings (150) are configured to guide the motion of the tether relative to the engagement surface.

3. The module according to claim 1 wherein the clamp mechanism includes a rotatable door configured to move from a free position to a clamped position to the tether against the adjacent surface thereby halting further motion of the tether.

4. The module according to claim 1 wherein the tether stopping means includes a friction enhanced engagement surface (180) for engaging the tether and urging same against the housing.

5. The module according to claim 1 wherein the engagement surface includes one of friction enhancing material or protrusions (182).

6. The module according to claim 1 further including actuator means (70) for at least initiating movement of the tether stopping means to the engaged position.

7. The module according to claim 1 wherein the adjacent surface further includes additional openings (150) to permit the flow of inflation gas from an inflator into the air bag.

8. The module according to claim 1 wherein the tether (52) includes an opposing end (54) securable to a non-moving part (60) within the module.

9. The module according to claim 1 wherein the tether (52) includes an opposing end (54) configured to become stuck in one of the openings (152).

10. An air bag module (30) comprising:
    an air bag (300) and a tether (52) with one end secured to and movable with the air bag upon inflation of the air bag;
    a housing (40) having a first housing portion (44) for receiving the air bag and a second housing portion (42) for supporting an inflator (60), the first housing portion includes a diverter for receiving inflation gas from the inflator (60) and for distributing the inflation gas through at least one opening (122) into the air bag (300), the diverter including one slot (120) through which the tether is slidingly received, the housing further includes an intermediate housing member (170) having first and second elongated openings (150), the openings being spaced apart and generally parallel to each other, the openings configured to guide the tether relative to an adjacent surface, the tether threaded through the first and second openings, the intermediate housing member and openings configured so that the tether slides relative to the adjacent surface (172a) of the intermediate housing member during inflation of the air bag; the housing further includes a vent (144), which when opened diverts inflation gas away from the intermediate housing member and from the air bag;
    the housing and inflator configured to permit inflation gas to flow primarily from the inflator through the intermediate housing member or from the inflator through the vent when the vent is open; and
    tether stopping means (82) including a door movable from a first position disengaged from the tether, but in engagement with the vent to close the vent to a second position in engagement with the tether during air bag inflation for stopping the tether and in the second position the door is away from the vent to open the vent.

11. The module according to claim 10 wherein the module further includes actuator means (70) for at least initiating movement of the door.

12. The module according to claim 11 wherein the door is configured to be placed within a stream of inflation gas flowing from the inflator to the intermediate housing portion, the stream of inflation gas urging the door against the tether.

* * * * *